US009783750B2

(12) United States Patent
Vander Hoff et al.

(10) Patent No.: US 9,783,750 B2
(45) Date of Patent: Oct. 10, 2017

(54) BIODIESEL FUEL PRODUCTION, SEPARATION METHODS AND SYSTEMS

(71) Applicant: SMARTFLOW TECHNOLOGIES, INC., Apex, NC (US)

(72) Inventors: Mark Vander Hoff, Apex, NC (US); Todd Benson, Cary, NC (US); Jason Bell, Pleasant Dale, NE (US); Marc Pugh, Sanford, NC (US)

(73) Assignee: SMARTFLOW TECHNOLOGIES, INC., Apex, NC (US)

( * ) Notice: Subject to any disclaimer, the term of this patent is extended or adjusted under 35 U.S.C. 154(b) by 533 days.

(21) Appl. No.: 13/765,782

(22) Filed: Feb. 13, 2013

(65) Prior Publication Data

US 2013/0236938 A1   Sep. 12, 2013

Related U.S. Application Data

(60) Provisional application No. 61/669,338, filed on Jul. 9, 2012, provisional application No. 61/599,750, filed on Feb. 16, 2012.

(51) Int. Cl.
| | |
|---|---|
| *C10L 1/02* | (2006.01) |
| *B01D 37/00* | (2006.01) |
| *C10G 3/00* | (2006.01) |
| *C10G 33/06* | (2006.01) |
| *C11C 3/00* | (2006.01) |
| *B01D 61/14* | (2006.01) |
| *B01D 61/16* | (2006.01) |
| *B01D 63/08* | (2006.01) |
| *C11B 13/00* | (2006.01) |
| *B01D 17/00* | (2006.01) |
| *C02F 1/44* | (2006.01) |
| *C02F 11/12* | (2006.01) |
| *C02F 101/32* | (2006.01) |

(52) U.S. Cl.
CPC .............. *C10L 1/02* (2013.01); *B01D 37/00* (2013.01); *B01D 61/142* (2013.01); *B01D 61/16* (2013.01); *B01D 63/084* (2013.01); *C10G 3/00* (2013.01); *C10G 33/06* (2013.01); *C10L 1/026* (2013.01); *C11B 13/00* (2013.01); *C11C 3/003* (2013.01); *B01D 17/10* (2013.01); *B01D 2311/04* (2013.01); *B01D 2315/10* (2013.01); *C02F 1/444* (2013.01); *C02F 11/121* (2013.01); *C02F 2101/325* (2013.01); *Y02E 50/13* (2013.01); *Y02P 30/20* (2015.11); *Y02W 30/74* (2015.05)

(58) Field of Classification Search
CPC ............ C10L 2200/0446; C12P 7/649; C10G 2300/1014; C11B 3/003; C12Y 301/04003; Y02E 50/13; C11C 3/003
USPC ........................................................ 435/134
See application file for complete search history.

(56) References Cited

U.S. PATENT DOCUMENTS

| | | | |
|---|---|---|---|
| 4,867,876 | A | 9/1989 | Kopf |
| 4,882,050 | A | 11/1989 | Kopf |
| 4,956,085 | A | 9/1990 | Kopf |
| 5,034,124 | A | 7/1991 | Kopf |
| 5,049,268 | A | 9/1991 | Kopf |
| D322,117 | S | 12/1991 | Kopf |
| D323,202 | S | 1/1992 | Kopf |
| D324,720 | S | 3/1992 | Kopf |
| D325,070 | S | 3/1992 | Kopf |
| D327,313 | S | 6/1992 | Kopf |
| D328,789 | S | 8/1992 | Kopf |
| 5,232,589 | A | 8/1993 | Kopf |
| 5,342,517 | A | 8/1994 | Kopf |
| 5,360,555 | A | 11/1994 | Batten |
| D357,059 | S | 4/1995 | Kopf |
| 5,543,050 | A | 8/1996 | Roshanravan |
| 5,593,580 | A * | 1/1997 | Kopf .................. 210/321.75 |
| 5,730,029 | A | 3/1998 | Stoldt et al. |
| 5,868,930 | A | 2/1999 | Kopf |
| 6,022,742 | A | 2/2000 | Kopf |
| 6,048,727 | A | 4/2000 | Kopf |
| 6,139,746 | A | 10/2000 | Kopf |
| 6,214,221 | B1 | 4/2001 | Kopf |
| 6,214,574 | B1 | 4/2001 | Kopf |
| 6,383,380 | B1 | 5/2002 | Kopf |
| 6,464,875 | B1 | 10/2002 | Woodruff |
| 6,569,340 | B2 | 5/2003 | Kopf |
| 6,596,172 | B1 | 7/2003 | Kopf |
| 6,827,960 | B2 | 12/2004 | Kopf et al. |
| 6,852,352 | B2 | 2/2005 | Kopf et al. |
| 6,875,459 | B2 | 4/2005 | Kopf et al. |
| 6,946,075 | B2 | 9/2005 | Kopf |
| 7,384,562 | B2 | 6/2008 | Rogers |
| 7,544,296 | B2 | 6/2009 | Kopf et al. |

(Continued)

FOREIGN PATENT DOCUMENTS

| | | |
|---|---|---|
| WO | WO 2011088373 | 7/2011 |
| WO | WO 2012115932 | 8/2012 |

OTHER PUBLICATIONS

Drapcho et al. Biofuels engineering process technology. The McGraw-Hill Companies, Inc. 2008;197-268.*

(Continued)

*Primary Examiner* — Lynn Y Fan

(74) *Attorney, Agent, or Firm* — Marianne Fuierer; Moore & Van Allen, PLLC

(57) ABSTRACT

The present invention provides for a method for treatment of fats, oils and grease (FOG) for separation of target products and/or the efficient production of biodiesel while reducing disposal of solid or liquid waste matter into landfills or water treatment facilities.

11 Claims, 6 Drawing Sheets

(56) References Cited

U.S. PATENT DOCUMENTS

| | | | |
|---|---|---|---|
| 7,632,319 | B2 | 12/2009 | Rogers |
| 7,767,839 | B2 | 8/2010 | Berry et al. |
| 8,366,794 | B2 | 2/2013 | Tremblay et al. |
| 2006/0004237 | A1 | 1/2006 | Appel et al. |
| 2008/0250700 | A1* | 10/2008 | Tremblay et al. ............ 44/301 |
| 2011/0309018 | A1 | 12/2011 | Kopf et al. |
| 2012/0205311 | A9 | 8/2012 | Kopf et al. |
| 2013/0015119 | A1 | 1/2013 | Pugh et al. |
| 2013/0115588 | A1 | 5/2013 | Davis et al. |
| 2013/0212932 | A1 | 8/2013 | Bell et al. |

OTHER PUBLICATIONS

Fjerbaek et al. A review of the current state of biodiesel production using enzymatic transesterification. Biotechnology and Bioengineering. 2009;102(5):1298-1315.*

Dube et al. Biodiesel production using a membrane reactor. Bioresource Technology. 2007;98:639-647.*

Chakrabarti, Alicia R. et al. "4Waste Grease Biodiesel Production at a Wastewater Treatment Plant." WEFTEC®08, 2008, pp. 2770-2789.

Drapcho, Caye M. et al. "Biofuels Engineering Process Technology." 2008 The McGraw-Hill Companies, Inc.

Durrett, Timothy, P. "Plant triacylglycerols as feedstocks for the productions of biofuels." The Plant Journal (2008) vol. 54, pp. 593-607.

Fjerbaek, Lene et al. "A Review of the Current State of Biodiesel Production Using Enzymatic Transesterification." Biotechnology and Bioengineering, vol. 102, No. 5, Apr. 1, 2009.

Galitsky, Christina et al. "Energy Efficiency Improvement and Cost Saving Opportunities for the Corn Wet Milling Industry." Ernest Orlando Lawrence Berkeley National Laboratory, Jul. 2003.

Stockinger, Herman. "Converting Waste to BioDiesel." World Biofules Markets 2011, Rotterdam, Mar. 24, 2011.

Kawakami, Koei et al. "Application of a *Burkholderia cepacia* lipase-immpbilized silica monolith to batch and continuous biodiesel production with a stoichiometric mixture of methanol and Jatropha oil." Biotechnology for Biofuels, 2011, 4:42.

Luković, Nevena et al. "Biodiesel Fuel Production by Enzymatic Transesterification of Oils: Recent Trends, Challenges and Future Perspectives." Alternative Fuel, 2011, pp. 47-72.

Mittelbach, Martin. "Biodiesel: Production Technologies and Perspectives." Institute for Chemistry (IFC) Working Group Renewable Resources, Karl-Franzens-University Graz, A-0810 Graz, Austria, Sep. 19, 2005.

"Biodiesel Handling and Use Guide." National Renewable Energy Laboratory, 4$^{th}$ Edition, 2009.

Paynich, Mallory. "Transesterification of Vegetable Oils to Produce Biodiesel Fuel." MMG445 eJournal, 2005.

Sheedlo, Michael. "A review of the processes of biodiesel production." MMG 445 Basic Biotechnology eJournal, 2008, 4:61-65.

Tyson, K. Shaine. "Brown Grease Feedstocks for Biodiesel." National Renewable Energy Laboratory, Jun. 19, 2002.

\* cited by examiner

BIODIESEL FUEL PRODUCTION, SEPARATION METHODS AND SYSTEMS

CROSS-REFERENCE TO RELATED APPLICATIONS

This application claims priority to U.S. Provisional Application No. 61/599,750 filed on Feb. 16, 2012 and U.S. Provisional Application No. 61/669,338 filed on Jul. 7, 2012, the contents of both are incorporated by reference herein for all purposes.

FIELD OF INVENTION

The present invention provides for a method for treatment of fats, oils and grease (FOG) for the efficient production and purification of biodiesel while separating important additional components and reducing disposal of solid or liquid waste matter into landfills or water treatment facilities.

BACKGROUND OF THE INVENTION

Biodiesel is a diesel replacement fuel for compression-ignition (CI) engines and is a legally registered fuel and fuel additive with the U.S. Environmental Protection Agency (EPA). The EPA registration includes all biodiesel that meets the ASTM specification ASTM D 6751 and such standards do not depend on the oil or fat used to produce the biodiesel or the specific production process employed.

The biodiesel manufacturing process converts fats and oils into chemicals called long-chain mono-alkyl esters or biodiesel. These chemicals are also referred to as fatty acid methyl esters (FAME). The term mono-alkyl ester indicates that biodiesel contains only one ester linkage in each molecule.

Fats and oils are composed principally of triglycerides made up of a glycerol moiety in which the hydroxyl groups are esterified with carboxylic acids. Whereas solid fats tend to be formed by triglycerides having saturated fatty acids, triglycerides with unsaturated fatty acids tend to be liquid (oils) at room temperature. Monoglycerides and diglycerides, having respectively one fatty acid ester and two alcoholic groups or two fatty acid esters and one alcoholic group, are also found in fats and oils to a lesser extent than triglycerides.

Biodiesel is produced through a chemical reaction of a triglycerides (TG) or free fatty acids (FFA) with an alcohol, such as methanol, to form an alkyl ester. Free fatty acids, which are found in degraded oils such as FOG, can be converted to esters using an acid catalyst. Triglycerides can be converted using an alkaline catalyst. In the alternative, conversion of both free fatty acids and triglycerides may be effected with enzyme catalysis by using lipases obtained from microorganisms including but not limited to *Rhizomucor miehei, Rhizopus* species, *Aspergillus niger, Candida cylindracae, Candida antartica, Thermomyces Lanuginosa, Pseudomonas* species, *Arthrobacter* species, etc.

Also included in the grouping for conversion to biodiesel are recycled greases, such as cooking oils and restaurant frying oils. Grease is a material, either liquid or solid, composed primarily of fats, oils and grease (also referred to as FOG) from animal or vegetable sources. Yellow grease is oil and grease that comes directly from fryers and other cooking equipment. Trap grease or brown grease is waste that is recovered from grease traps and interceptors. A grease trap is a small volume device located inside a food service facility, generally under a sink, designed to collect, contain, or remove food wastes and brown grease from the waste stream while allowing the balance of the liquid waste to discharge into the wastewater collection system, usually a sanitary sewer system. A grease interceptor is a large volume device located underground and outside of a food service facility designed to collect, contain or remove food wastes and brown grease from the waste stream while allowing the balance of the liquid waste to discharge to the wastewater collection system, usually a sanitary sewer system.

Recognizing the negative effects of fats, oil and grease on sewer systems and/or waste water treatment plants, it is important to inhibit the FOG from entering into wastewater collection systems and/or landfill sites. Communities, counties, and water districts are grappling with the issue of how best to handle grease trap wastes. Most wastewater treatment plant managers feel that from a technical point of view, it is best to have regulations requiring restaurants to have grease traps pumped regularly, and to have the waste discharged at wastewater treatment plants where it can be properly treated and disposed of. Thus, there are grease trap pumping companies that collect the waste and deliver to facilities that can convert grease to inert solids or convert to useable materials such as biogas, biodiesel, biological fertilizer, etc.

Importantly the FOG in the grease traps can include emulsified FOG which cannot be easily floated off the surface. Spent FOG is 10 to 15 percent lighter than water and will float to the surface of liquid medium in a container if not emulsified. Emulsification is the term given to the condition when spent FOG does not separate from water. This is a concern because emulsification allows spent FOG to pass readily through grease traps to enter other systems. Thus, a separation method must consider a system that entraps any emulsified FOG.

In light of the above discussion, there is a need for purification and production systems that efficiently provide for producing biodiesel fuels and other valuable components from trap oils, trap greases, brown greases, yellow grease and grease trap waste while producing a minimal amount of negative effects on sewer systems, wastewater treatment facilities and/or landfill sites.

SUMMARY OF THE INVENTION

In accordance with the present invention, there is a method for producing an alkyl ester via a transesterification and/or esterification reaction starting with an oil source including primarily of fats, oils and grease (also referred to as FOG) from animal or vegetable sources. The method includes (1) mixing an oil source containing triglycerides and/or free fatty acids with an alcohol in the presence of a biocatalyst or chemical catalyst to produce an alkyl ester. Examples of a suitable oil source include plant oil (e.g., microalgae oil), animal oil (e.g., fish oil, lard, rendered fats, or tallow), cooking oils, waste grease (e.g., yellow grease, brown grease, and waste restaurant grease), etc.

To make a biodiesel molecule, transesterification and/or esterification of oils and fatty acids can be accomplished in the presence of an alcohol and a catalyst. In biodiesel production, there are two classes of chemical compounds used as a catalyst, that being, alkali catalysts and acid catalysts. The catalysts can be used alone or in combination depending on the amount of free fatty acids in the oil. For example an acid catalyst may be used first to lower the amount of free fatty acids in the oil. Once the free fatty acid content has been decreased, an alkali catalyst may be added, to increase yield of the end product of alkyl esters.

Chemical esterification is preferably conducted using an alcohol and sulfuric acid as the acid catalyst, as shown below. Common alcohols used in this process are short chain alcohols, most notably methanol and ethanol. However, biodiesel can be made from isopropyl and other alcohols, but most biodiesel fuels focuses on methyl esters. Transesterification, as shown below, is conducted in the presence of an alkaline salt and methanol wherein the alkaline salt can be selected from sodium methoxide, sodium hydroxide, potassium hydroxide, etc. Glycerin (also named glycerol and glycerine) is a co-product of the biodiesel production process.

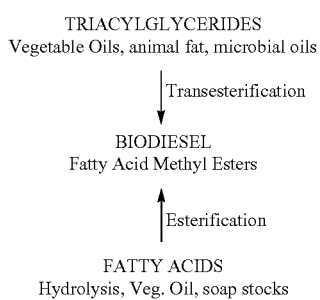

The biocatalyst refers to a lipase enzyme (triacylglycerolhydrolases) capable of catalyzing a transesterification and/or esterification reaction. Examples of applicable lipases include but are not limited to *candida antarctica* lipase, *thermomyces lanuginosa* lipase, *Rhizomucor miehei* lipase, *Rhizopus oryzae* lipase, *candida rugosa* lipase, *Candida cylindracae* lipase *pseudomonas fluorescens* lipase, *Aspergillus niger* lipase, *pseudomonas cepacia* lipase, *chromobacterium viscosum* lipase, etc. The lipase component can include a single lipase or a combination of two or more lipases. The lipases(s) may be free in a solution or immobilized on a carrier in a reaction vessel and generally the transesterification or esterification reaction can be carried out at 20-95° C. for 10-90 minutes to obtain an alkyl ester. In the event, the enzymes are free and suspended in a liquid, such a liquid may include an ionic liquid containing long alkyl-chain cations which still provide enzymatic activity for biodiesel production. Thus, the use of the liquids provides the possibility of recycling the biocatalyst and the easy separation of the biodiesel from the reaction mixture. The liquids may include 1-hexadecyl-3-methylimidazolium triflimide or and 1-octadecyl-3-methylimidazolium triflimide and provides for separation from the reaction the produced biodiesel and the recycling of both the liquid and the enzyme.

One of the major issues of producing biodiesel is limiting the presence of water and free fatty acids in solution which may result in the formation of soap in the presence of some catalysts. To avoid this problem the use of a higher grade of oils may be used but of course this includes a higher cost of refining such oils. To overcome this issue, acceptor molecules, such as, described by Du et al, (U.S. Pat. No. 7,473,791) may be used.

Another issue confronting the production of biodiesel occurs during the transesterification of oil wherein unwanted high levels of glycerol may be formed. The presence of glycerol requires additional purification and has been shown to reduce the function of some biocatalysts (enzymes) because of additional reactions. Thus, it is important to provide separation of the generated glycerol and water from the reaction vessel not only after the conversion to FAME but also during the process. Importantly the separation of glycerol during the process enables the process to be operated as a continuous process rather in just a batch mode.

This separation of glycerol, water and other unwanted products can be accomplished by the use of a cross-flow filtration cassette of the present invention, as described hereinbelow. Specifically, the cross-flow filtration cassettes of the present invention comprises an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein the fatty acids and triglycerides, having a diameter larger than the filter sheet's pore size, are retained in the retentate flow, and at least a portion of the liquid medium with any permeate species including water and glycerol may diffuse through the filter sheets and enter the permeate sheet and permeate flow.

Preferably, each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet.

As stated above, the catalysts commonly used for this process are chemical catalysts or biocatalysts. The reactions for triglycerides, free fatty acids (FFA) with chemical catalysts and the use of lipases, are shown below:

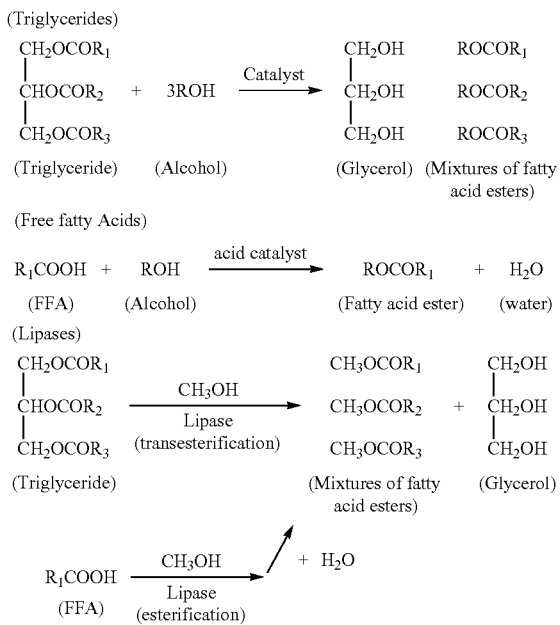

The cross-flow filtration cassette, as described above, may be used at many different junctions along production, separation and/or purification of the desired products. For example, the starting source of oil may include an unnecessary or unwanted amount of water, which may be separated before exposing the oil source to transesterification or esterification. Notably, if the starting oil source is trap grease or grease from a waste water plant, the removal of water will decrease the weight for transportation. Once the water is removed, such water may be further purified by additional passes through additional cross-flow filtration cassettes of the present invention to provide sufficiently purified water that may be introduced into waste water treatment streams for recycling, thereby avoiding fees for untreated and contaminated water.

Further, there may be additional components in the "water removed" oil source that could or should be removed. For example, there are solids or unwanted liquids mixed with the oil, such as fat/grease/food residue layer, that may be removed using the cross-flow filtration cassettes of the present invention thereby providing a more purified source for input into the chemical or enzymatic productions or FAME. Notably, remainders left in the as fat/grease/food residue layer may be used for animal feed, fertilizer, boiler feed fuel, bioreactor feed, and numerous other applications requiring a carbon source as input.

Importantly it has been found that using the cross-flow filtration cassettes of the present invention include the advantage of acting as a deodorizing system and advantageously deal with the obnoxious smell of using brown grease. The constituents that cause the obnoxious smell are passed through the membrane into permeate and this could be a key feature enabling the retained concentrated grease/fat/food particulate to be used as animal feed In another aspect, the present invention provides for subjecting a starting trap grease material to a pretreatment, that being a first purification step wherein solids are removed from trap grease by the use of screen meshing or a similar filtering device, a separation step wherein water is removed from the purified trap grease with the use of a cross-flow filtration unit to form a permeate water stream and a retentate trap grease stream. The organic rich permeate can be used as a liquid fertilizer, bioreactor feed or other uses.

A second purification step may be conducted on the permeate water stream to remove any additional precipitation products using a second cross-flow filtration unit comprising filtration screens having smaller pore size than the first cross flow filtration unit thereby providing an essentially clear water permeate stream. The retentate trap grease stream is moved on for further processing to produce biodiesel fuels.

In another aspect, the present invention preferably provides for preparation of $C_1$-$C_3$ alkyl esters by transesterification of said fatty acid, glyceride and said $C_1$-$C_3$ alcohol, and the esterification of said free fatty acid and said $C_1$-$C_3$ alcohol.

In yet another aspect, the present invention provides for a method for separating water from a FOG containing source liquid, the method comprising the steps of:
(a) providing a FOG containing source liquid, wherein the liquid can be a viscous or non-viscous liquid, comprising fatty acids and triglycerides;
(b) providing at least one cross-flow filtration cassette comprising:
    an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein the fatty acids and triglycerides, having a diameter larger than the filter sheet's pore size, are retained in the retentate flow, and at least a portion of the liquid medium with any permeate species diffuse through the filter sheets and enter the permeate sheet and permeate flow;
(c) effectuating a sufficient flow of the FOG containing source liquid comprising the target molecules through at least one cross-flow filtration cassette.

In yet another aspect, the present invention provides for production of biodiesel fuel from an oil or grease source, wherein the oil or grease source comprises free fatty acids and triglycerides, the method comprising:
(a) providing oil or grease source as a liquid medium, wherein the oil or grease source is optionally filtered through a mesh type screen to remove any large particles therefrom;
(b) moving the oil or grease source through a cross-flow filtration unit according to the present invention wherein such oil or grease source is dewatered and the water content is separated into a water permeate stream and the remaining oil or grease source in the retentate stream is collected;
(c) combining the oil or grease source retentate with a chemical catalyst or biocatalyst in a reaction medium to cause conversion of fatty acids and/or glycerides to FAME;
(d) separating the formed crude biodiesel and crude glycerol from the reaction medium by using a cross-flow filtration cassette of the present invention;
(e) separating the crude glycerol, water and other components from the crude biodiesel using another cross-flow filtration unit of the present invention,
(f) optionally the crude glycerol can be further purified with additional cross-flow filtration cassettes of the present invention thereby forming a refined glycerol; and
(g) optionally refining the crude biodiesel with a cross-flow filtration cassette of the present invention to remove any unwanted water and to meet the ASTM standards for biodiesel.

Optionally the water permeate stream can be further purified to remove any unwanted precipitants with a cross-flow filtration cassette of the present invention to provide a further purified water permeate stream.

Further, if a biocatalyst is used, that being lipases, these enzymes may be separated from the produced esters, triglycerides, biodiesel and/or "heavy phase" containing glycerol, water and methanol, by passing the fluid of the reaction vessel through at least one cross-flow filtration cassette of the present invention, wherein the enzymes may be recaptured for further use. Importantly by using a cross-flow filtration cassette of the present invention, the enzymes are isolated and such enzymes are still active with the appropriate and effective tertiary structure for reuse. If the heavy phase is filtered, the crude glycerol water and methanol mixture can be further purified by passing the mixture through a cross-flow filtration cassette of the present invention to produce a technical grade glycerol permeate.

As stated above, conversion of both free fatty acids and triglycerides may be effected with enzyme catalysis by using lipases as described above. The enzymes can be used in some purified form, such as free floating. Importantly the present invention allows for the enzymes to be used in a natural state without the cost or loss of activity associated with immobilizing them to a solid carrier. The process of immobilization reduces the inherent flexibility of the enzyme molecule which is required to perform its catalytic activity.

In the alternative, they are attached to some carrier material such as polymeric resin beads or diatomaceous earth so that the enzymes can be separated after reaction and re-used. Enzymes can be immobilized by various techniques such as absorption on carrier, attachment to ion exchange resins, covalent bond attachment to supports, trapping in hydrophobic gels etc.

The transesterification process may be carried out by forming a reaction mixture containing at least the fatty-acid containing substances, alcohols, enzymes, and sufficient water to confer enzymatic activity, incubating the reaction mixture for a time and at a temperature sufficient for the reaction (i.e. transesterification between the fatty acid-containing substance and the alcohol) to occur and separating the undesirable end products (glycerol, water and enzyme) from the alkyl ester-containing biofuel portion of the reaction mixture. The reaction is generally carried out at about room temperature, however, slightly elevated temperatures (up to about 60° C.) produce acceptable levels of enzyme activity. The amount of incubation time considered effective varies considerably from one enzyme/substrate combination to another. This amount is easily determined experimentally, however, by carrying out time course experiments. Starting materials include fatty acid, triglycerides, phospholipids, fatty acid esters and other esters which are substrates for the particular enzyme chosen as catalyst. Alcohol limitations are dictated by the choice of enzyme to be used as catalyst, since some will accept only primary alcohols while others will accept primary as well as secondary ones.

Ester production occurs directly in the fuel, eliminating isolation and purification prior to blending. Preferably, end by-products (glycerol, water and enzyme) may be separated from the biofuel by using the cross-flow filtration cassettes of the present invention are far more efficient. If gravity separation is used to separate the end by-products, the end by-products can be filtered using a cross flow filtration cassette of the present invention to retain and recover the enzyme for reuse and the crude glycerol for use or further purification to technical grade glycerol (glycerin).

For efficient use of the enzyme, it is desirable that some water should be present during the ester formation, however, water also tends to hydrolyze the ester so that only very small amounts are desirable, in particular amounts which dissolve in the starting mixture. When water of reaction is formed as the reaction progresses, as is the case when fatty acid is reacted with alcohol, it is desirable that excess water should be removed during the reaction. It is also desired to remove the glycerol (glycerin) as it is produced. As such, such glycerol and water can be removed in a continuous type process wherein the reaction mixture is passed through a crossflow filtration cassette as described herein. Importantly, the enzyme and reaction products are retained in the retentate stream and the glycerol and water in the permeate stream is removed thereby maintaining an effective level of water and/or glycerol in the reaction vessel.

In a further embodiment, the process may include the separation of any remaining alcohol, produced glycerol and water in a single step using a cross-flow filtration cassette of the present invention, leaving behind the purified biodiesel product. If an enzyme is used for the transesterification or esterification, such lipase enzyme can be removed in multiple points along the processes. For example, the enzymes can be removed immediately after the enzymatic reaction wherein the FAME, water, glycerol and any remaining unmodified triglycerides or free fatty acids are separated from the enzymes. The enzymes can be recirculated and reintroduced for further use. Notably using the cross-flow filtration cassettes of the present invention enables the controllable separation of products wherein the ratio of separation products can be predetermined and thus predictable instead of a mere estimate.

In yet another embodiment, the process may include the separation of any remaining alcohol, produced glycerol and water (collectively referred to as the "heavy phase") by gravity settling as in the current industry practice of separating the biodiesel (light phase) from the reaction by-products. The glycerol, water and methanol mixture can be recovered from the heavy phase in a single step using a cross flow filtration cassette of the present invention retaining the enzyme for reuse in subsequent production of biodiesel. The enzymes can be recirculated and reintroduced for further use. Notably using the cross flow filtration cassettes of the present invention enables the controllable separation of the enzymes from the reaction products.

The removal of water and sediment from biodiesel is important because excessive water during storage can cause biodiesel to be out of specification. Further excess water can lead to corrosion and provide an environment for microorganism. Further, the reduction of water content of trap grease reduces the cost of such grease because of high transportation cost, such as moving trap grease from grease interceptors to a centralized reaction area for further processing into biodiesel. The removal of alcohol is important because residual methanol in the fuel is a safety issue and even a small amount can reduce flash point, affect fuel pumps and seals. Finally the removal of glycerin and the quantitation of such glycerin provide an indication of the completeness of conversion of triglycerides into biodiesel. For example, incomplete conversion of triglycerides to long chain mono alky esters can lead to lower levels of glycerin because the transesterification reaction was not completed.

In yet a further aspect, the present invention provides for a system to process grease trap refuse and separate all fats, oils, and grease found in it, to obtain a homogenous grease or oil, free from inert materials, water and solids, suitable for other oleo-chemical processes and applications. Additionally, the present system can process grease trap dewatered refuse and recuperate the solvent used at the separation stage, delivering the recycled solvent back to a pre-mixing tank for its continued use.

Other aspects and advantages of the invention will be more fully apparent from the ensuing disclosure and appended claims.

DETAILED DESCRIPTION OF THE INVENTION

Figure 1:
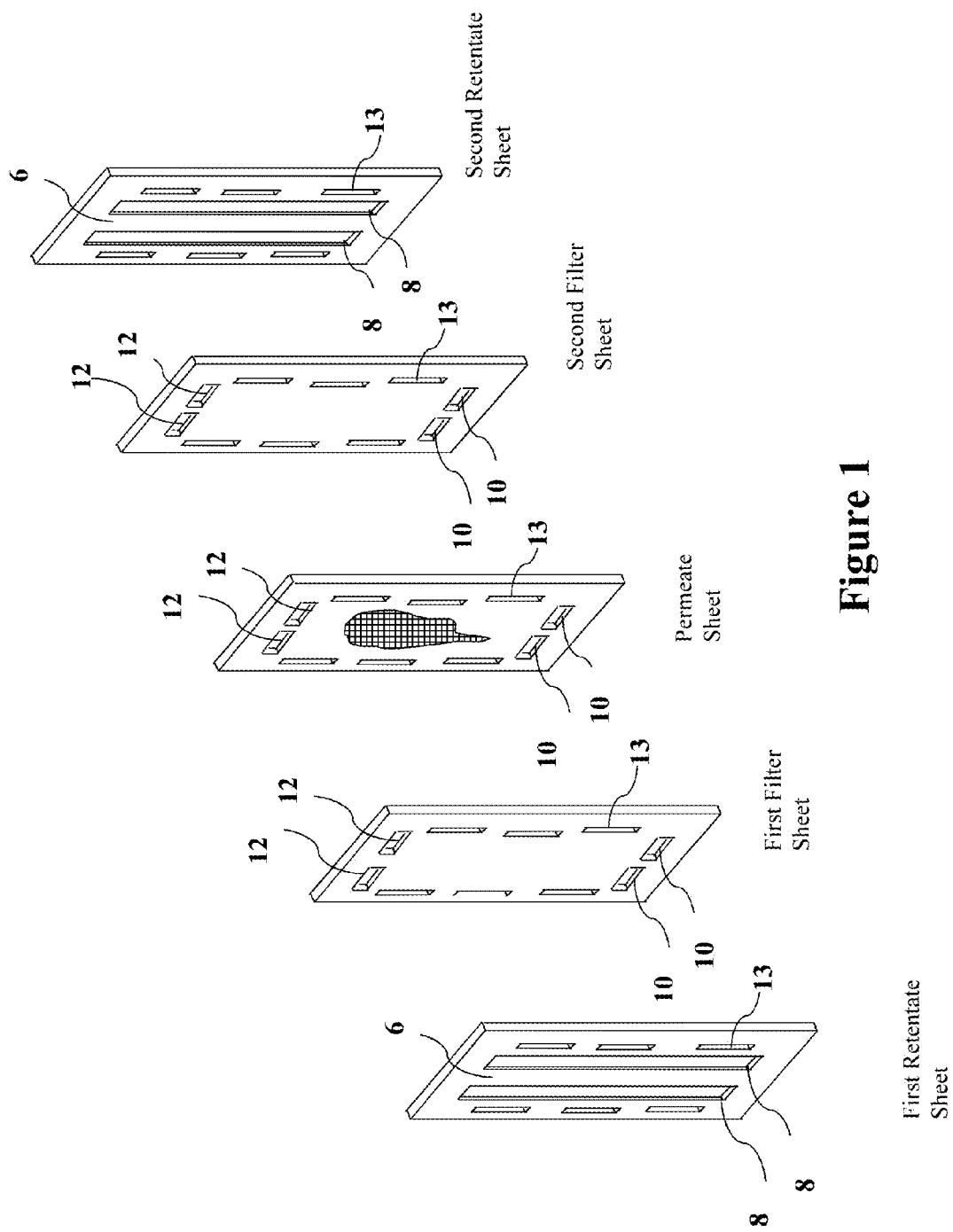
FIG. 1 shows the components of a cross-flow filtration cassette used in the separation of component in the production of biodiesel and other target products.

The present invention is a system for treating of trap grease, brown grease, and/or yellow grease for the production of biodiesel fuel without the major costs/drawbacks of the current FAME production process. Specifically, heretofore systems used for separation of desired products and contaminants in the biodiesel production involved exorbitant volumes of water to wash the soaps and contaminant out of the produced FAME. Such shortcomings relating to use of excessive water also involves high energy costs to provide a FAME product that meets ASTM specs.

The system of the present invention has the ability to enable waterless production of FAME by preferentially passing the FAME and restraining the soaps and particulates, thereby avoiding the use of water altogether. In the alternative, if the production process does use water, the water can be easily cleaned to remove contaminants, and as such, can be then recycled to be used again rather than discarded to a drain system. Notably this cleaning and recycling can be advantageously configured to occur concurrently. The cross-flow filtration cassettes of the present invention can be used in combination with conventional spiral technology or preferably performs separation and permeate clean up, thereby rendering multiple reuses of the cleaned permeate.

The term "cross-flow filtration cassette" refers to a type of filter module or filter cassette that comprises a porous filter element across a surface of which the liquid medium to be filtered is flowed in a tangential flow fashion, for permeation through the filter element of selected component(s) of the liquid medium. In a cross-flow filter, the shear force exerted on the filter element (separation membrane surface) by the flow of the liquid medium serves to oppose accumulation of solids on the surface of the filter element. Cross-flow filters include microfiltration, ultrafiltration, and nanofiltration systems. The cross-flow filter may comprise a multiplicity of filter sheets (filtration membranes) in an operative stacked arrangement, e.g., wherein filter sheets alternate with permeate and retentate sheets, and as a liquid to be filtered flows across the filter sheets, impermeate species, e.g. solids or high-molecular-weight species of diameter larger than the filter sheet's pore size, are retained and enter the retentate flow, and the liquid along with any permeate species diffuse through the filter sheet and enter the permeate flow. In the practice of the present invention, cross-flow filtration is a preferred separation method. Cross-flow filter modules and cross-flow filter cassettes useful for such filtration are commercially available from Smartflow Technologies, Inc. (Apex, N.C.). Suitable cross-flow filter modules and cassettes of such types are variously described in the following United States patents: U.S. Pat. No. 4,867,876; U.S. Pat. No. 4,882,050; U.S. Pat. No. 5,034,124; U.S. Pat. No. 5,034,124; U.S. Pat. No. 5,049,268; U.S. Pat. No. 5,232,589; U.S. Pat. No. 5,342,517; U.S. Pat. No. 5,593,580; and U.S. Pat. No. 5,868,930; the disclosures of all of which are hereby incorporated herein by reference in their respective entireties.

The term "glycerol," as used herein, also is referred to as glycerine or glycerin, is a simple polyol compound having three hydroxyl groups that are responsible for its solubility in water and its hygroscopic nature.

In one particular aspect, the present invention relates to a cross-flow filtration cassette, as shown in FIG. 1, comprising a multilaminate array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the permeate and filter sheet members in said array has at least one inlet basin opening 10 at one end thereof, and at least one outlet basin opening 12 at an opposite end thereof, with permeate passage openings 13 at longitudinal side margin portions of the sheet members;

each of the first and second retentate sheets having at least one channel opening 8 therein, extending longitudinally between the inlet 10 and outlet basin 12 openings of the permeate and filter sheets in the array, and being compression bonded to an adjacent filter sheet about peripheral end and side portions thereof, with their basin openings and permeate passage openings in register with one another and the permeate passage openings of each of the retentate sheets being circumscribingly compression bonded to the adjacent filter sheet, and with a central portion of each of the retentate sheets and adjacent filter sheets being unbonded to permit permeate contacting the retentate sheet to flow through the filter sheet to the permeate sheet; and each of the filter sheets being secured at its peripheral portions on a face thereof opposite the retentate sheet, to the permeate sheet.

The term "sheet" will denote the generally planar members of the cassette, the cassette thus comprising an assembly of permeate sheets, filter sheets, and retentate sheets, coupled to one another in such manner as to permit flow of the fluid to be separated through the flow channel(s) of the device, for mass transfer involving passage of the permeate through the filter sheets, and retention of the retentate on the side of the filter sheet opposite the side from which the permeate emerges.

The term "compressible" in reference to the retentate sheet or other structural feature or sheet member of the present invention means that such component or member is compressively deformable by application of load or pressure thereon.

The above-described filtration cassette of the invention comprises a "base sequence" of elements, defined as a sequence of sheet elements constituting a compressible retentate sheet (hereafter designated by the symbol "CR"), a filter sheet (hereafter designated by the symbol "F"), a foraminous permeate sheet (hereafter designated by the symbol "P"), a second filter sheet ("F"), and a second compressible retentate sheet ("CR"), thereby providing a sequence of sheet elements, CR/F/P/F/CR.

Figure 2:
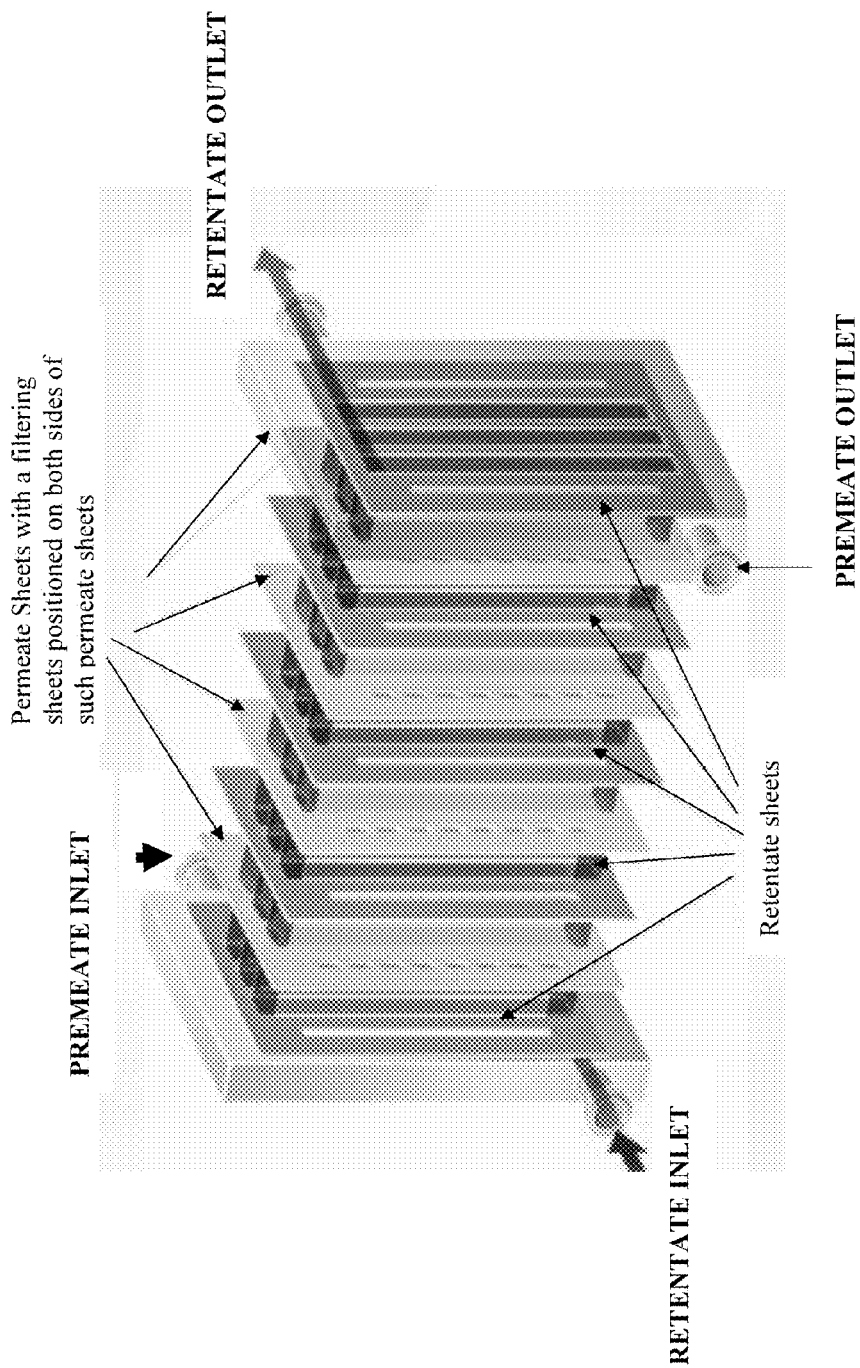
FIG. 2 shows the flow pattern of the retentate through a multiplicity of sheets adapted to end plates with retentate inlet and outlet and permeate inlet and outlet.

The base sequence of sheet elements may be utilized in construction of filters comprising a plurality of filtration cassettes, wherein the compressible retentate sheet is utilized to seal the top and bottom elements of a plurality of filtration cassettes of a sequence, comprising compressible retentate sheet "CR", filter sheet "F", foraminous permeate sheet P, filter sheet "F", non-compressible retentate sheet "R", filter sheet "F", foraminous permeate sheet P, filter sheet "F", and compressible retentate sheet "CR". An illustrative stacked cassette filter according to the invention may for example feature the sheet sequence CR/F/P/F/R/F/P/F/R/F/P/F/CR as shown in FIG. 2, comprising a first compressible retentate sheet, two base sequences of sheets FPFRFPF in a repetitive sequence, and a second compressible retentate sheet. In all repetitive sequences, other than a single cassette base sequence, the following relationship is observed: where X is the number of filter sheets F, the quantity 0.5 X−1 is the number of non-compressible retentate sheets R, and the quantity 0.5 X is the number of foraminous permeate sheets P, with two compressible retentate sheets being utilized to seal the top and bottom extremities of the intervening sequence.

Thus, it is possible to utilize a large number of base sequence cassettes in a repetitive sequence, to provide a stacked cassette filter of the desired mass transfer area. Many configurations are possible. It is feasible in some instances, e.g., for mass transfer studies and system quantitation, to utilize a single cassette comprising the base sequence CR/F/P/F/CR wherein the outermost retentate sheets in the sequence are compression-sealed at their outer faces to an end plate accommodating removal of permeate from the permeate passage openings of the constituent sheet members in the cassette.

The sheets of filter material used in the cassette article of the present invention may be of any suitable porosity rating. As used herein, the porosity rating of a sheet of filter material is the smallest particle size which cannot pass through the pores of the filter material. Typical porosity ratings are expressed in molecular weight (MW) and micrometer units, e.g., a 2 micron filter media sheet being a material which will pass particles smaller than 2 microns in diameter through the pores of the material, while particles larger than 2 microns will not be passed through the filter material, and as a further example, a 10,000 MW filter media sheet being a material which will pass particles smaller than 10,000 MW in diameter through the pores of the material, while particles larger than 10,000 MW will not be passed through the filter material.

In one preferred embodiment of the cassette article of the present invention, a retentate sheet is provided with a plurality of transversely spaced-apart, longitudinally extending ribs or partitions, extending upwardly from (the central portion of) each of the main top and bottom faces of the retentate sheet, such ribs or partitions being of substantially the same height and substantially parallel to one another to define a series of channels between the partitions, extending longitudinally between the respective basin openings of the retentate sheet, on both faces thereof. The adjacent filter sheets may be further bonded to the outer extremities of the ribs or partitions, and the ribs or partitions may be formed of any suitable material, e.g., a flexible resilient adhesive bonding medium, such as a urethanes, epoxy or silicone adhesive sealant medium, e.g., applied in a "bead" in the longitudinal direction of the retentate sheet on both main top and bottom faces thereof.

The term "bonded" in reference to adjacent sheets in the multilaminate cassette means that the adjacent sheets are secured to one another in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out by compressive bonding or with a suitable adhesive or sealant medium, e.g., a urethane, epoxy, cyanoacrylate, or silicone adhesive material, which fills the interstices of the foraminous sheet in the bonded pair of sheets, and adhesively joins one of the adjacent sheets to the other in the bonded areas.

The term "compressive bonding" and "compressively bonded" refer to bonding and bonding operations in which the structure being bonded is subjected to a compressive load or force, for sufficient time and under sufficient period to effect the bonding securement of the structure. Compressive bonding of laminae in the practice of the invention is highly desirable, in order to assure the leak-tightness and structural integrity of the resulting multilaminate assembly of the cassette.

The invention may for example be carried out with bonding of sheets in the multilaminate array to one another with cyanoacrylate or other "fast" adhesives, or alternatively the adhesive or sealant medium may require extended cure at ambient temperature or other appropriate cure conditions, and it may be advantageous to conduct such cure with the laminate structure in a fixture or other assembly in which the compressive bonding is effectively completed.

In a specific aspect of the invention, each of the foraminous permeate sheets may constitute a foraminous material of from about 80 to about 300 mesh size. Each of the foraminous permeate sheets may for example comprise a woven polymeric mesh, e.g., of a material selected from the group consisting of polyester, polypropylene, nylon, fluorocarbon polymers such as polytetrafluoroethylene, polyethylene, and polysulfone, and composites comprising one or more of such materials.

The filter sheets used in the filtration cassette of the present invention may be of any suitable materials, such as a material selected from the group consisting of cellulose, polyphenylene oxide, polysulfone, cellulose nitrate, cellulose acetate, regenerated cellulose, polyether amide, polyphenylene oxide/polysulfone blends, mixed esters of cellulose, and polyether sulfone. Some membranes are composed of composite materials and referred to as thin film composites (TFC).

Furthermore, it is possible to optimize the separate processes with cross-flow filtration modules of variable channel velocities but of uniform channel heights, given the fact that most commercial cross-flow modules are only available in a single channel height. When the channel height of a cross-flow filtration module is known, shear is directly proportional to channel velocity of such module for the same solution passing by.

In the literature, numerous techniques have been proposed to effect the separation of target substances using membrane separations with addition of foreign substances such as acid, base, salt and solvents. In contrast to these chemical additives-based methods, the methodology of the present invention permits a target substance to be separated from an input fluid by the simplest mechanical means. In the use of cross-flow filtration modules of the type described in the aforementioned patents, the specificity and speed of a desired separation is effected by a) fluid distribution in the cross-flow module, b) channel height of the cross flow module, c) channel length, d) shear rate, e) membrane pore structure, f) membrane structure, g) membrane chemistry, h) trans-membrane pressure, and i) pressure drop, which is a function of channel length, velocity and solution viscosity.

The approaches by others involving various additives and manipulations of transmembrane pressure appear to be predicated on overcoming problems created by poor distribution of flow within the cross-flow module. It is not to say that the addition of salts and solvents do not have a place in separation but without proper flow distribution the membrane separation cannot be optimally operated nor will cleaning techniques be fully beneficial. It will be appreciated, based on the disclosure herein that numerous heretofore expensive or difficult separations are rendered far simpler and more economical by employing the techniques described herein.

Thus, the invention relates in another aspect to optimizing the membrane separation process, comprising:

selecting a cross-flow membrane module wherein the distance from the inlet port to the outlet port is equidistant from the inlet to outlet for each sub-channel of the device, i.e., each sub-channel is of a same dimensional character;

selecting an optimal channel height;

selecting an optimal shear rate and/or channel velocity;

selecting an optimal transmembrane pressure;

selecting an optimal membrane pore size;

selecting an optimal temperature;

selecting an optimal channel length; and selecting an optimal pressure drop which is the composite of the optimal channel height;

the optimal shear rate and/or channel velocity;

optimal channel length; and the viscosity of the solution being filtered.

Selecting a channel height can be performed mathematically or empirically by trial and error. In most cell fermentation applications, trial and error has been more appropriate due to the fact that the viscosity of the cell broth or product solution is rarely known, the cell count and cell viability are highly variable, and the solution is frequently non-Newtonian. The objective of channel selection is to minimize channel height with three critical stipulations: first, the channel must be sufficiently high to allow the unrestricted passage of any larger material such as clumped cells; second, the channel should not cause excessive pressure drop and loss of linear efficiency; and third, the channel should be sufficiently high as to allow the proper angle of attack for substances to encounter the membrane pore and pass through the pore. The optimal channel height is dependent on the length and viscosity of the solution.

Several notable observations have been made in initial trials and process scale-up, as discussed below.

For suspensions having an optical density (OD) of 2 to 500, and a path length of 6 to 12 inches, start with a channel height between 0.4 to 0.75 mm. If the inlet pressure is above 15 PSIG at a velocity of 2.0 M/sec, then the channel is too thin.

For suspensions having an optical density (OD) of 2 to 500, and a path length of 6 to 12 inches, start with a channel height between 0.4 to 0.75 mm. If the inlet pressure is below 5 PSIG at a velocity of 2.0 M/sec the channel is too high.

For suspensions having an optical density (OD) of 2 to 500, and a path length of 25 to 40 inches, start with a channel height between 0.7 to 1.0 mm. If the inlet pressure is above 15 PSIG at a velocity of 2.0 M/sec, the channel is too thin.

For suspensions having an optical density (OD) of 2 to 500, and a path length of 25 to 40 inches, start with a channel height between 0.7 to 1.0 mm. If the inlet pressure is below 5 PSIG at a velocity of 2.0 M/sec, the channel is too high.

Another aspect of the present invention relates to a stacked cassette cross-flow filter comprising cassette articles of the type described above.

Still another aspect of the present invention relates to a pair of end plates or manifold assembly in which the cassettes are secured for operation as shown in FIG. 2.

Figure 3:
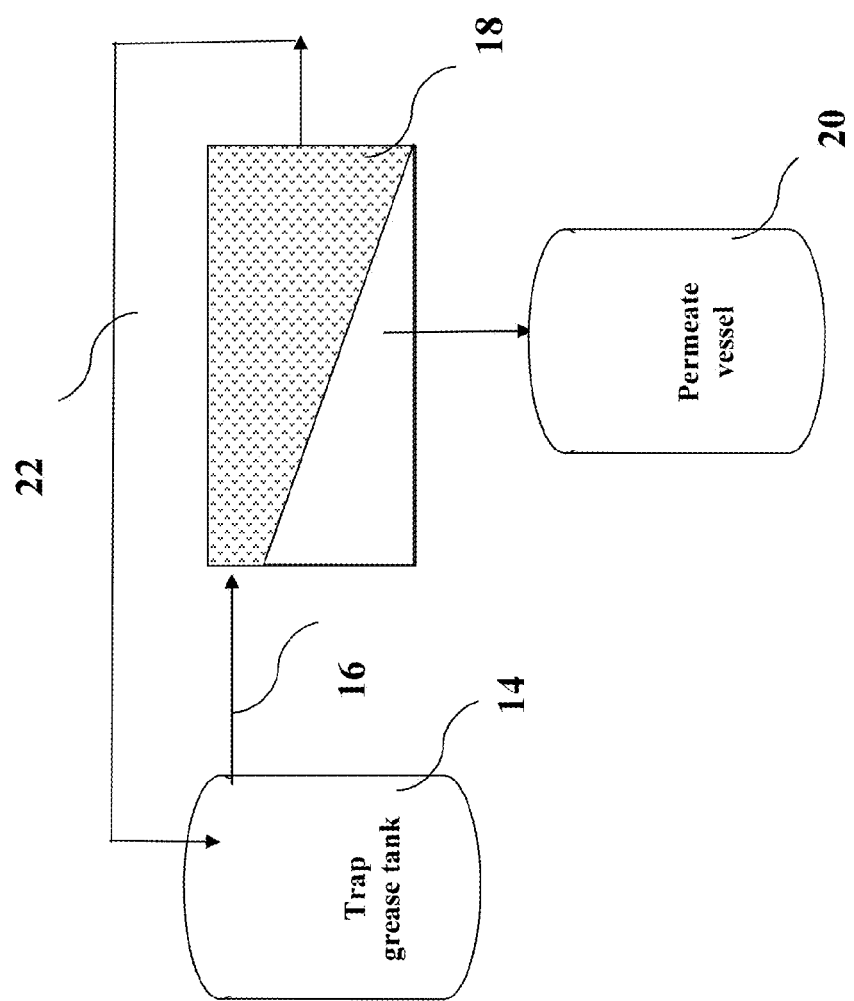
FIG. 3 shows a system for dewatering of trap grease for pretreatment before esterification and/or transesterification reactions.

FIG. 3 shows a system for dewatering a tank 14 of collected trap grease. The trap grease is removed from the tank and is introduced to the cross-flow filtration cassette 18 wherein the trap grease is separated into a retentate stream and a permeate stream. The retentate comprising the dewatered trap grease may be returned to the tank via process line 22 or sent on for further processing (not shown). The permeate (separated water) is introduced to the permeate vessel 20. Notably, the permeate can be further filtered using a second cross-flow filtration cassette of the present invention to further remove impurities and provide purified water that can be imported into a wastewater stream.

The components of the cross-flow filtration cassette 18 are described in FIG. 1 and relates to a filtration cassette comprising a multilaminate array of sheet members of generally rectangular and generally planar shape with main top and bottom surfaces, wherein the sheet members include:

(a) a first compressible retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective inlet 10 and outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;

(b) a first sheet member of filter material having (i) multiple basin openings, of a suitable shape, e.g., polygonal, semicircular, or sector shape, at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the foraminous permeate sheet member at their respective end and side portions, with their basin openings and permeate passage openings in register with one another and the basin openings being circumscribingly bonded at respective end portions of the first sheet member of filter material and the foraminous permeate sheet member, and with a central portion of the first sheet member of filter material and the foraminous permeate sheet member being unbonded so as to define a central portion permeate channel of the foraminous permeate sheet communicating with the permeate passages in the first sheet member of filter material and in the foraminous permeate sheet member;

(c) a foraminous permeate sheet member of screen or mesh material, having (i) multiple basin openings of suitable shape at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member;

(d) a second sheet member of filter material having (i) multiple basin openings at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the second sheet member of filter material is compression sealed to the retentate sheet member at their respective end and side portions, with their basin openings and permeate passage openings in register with one another and the permeate passage opening of the retentate sheet member being compression sealed to the second sheet member of filter material, and with a central portion of the second sheet member of filter material and the retentate sheet member being unbonded to permit permeate contacting the retentate sheet member to flow through the second sheet member of filter material; and (e) a second compressible retentate sheet member of suitable material, e.g. polysulfone, polyethersulfone, polycarbonate, urethane, silicone, having (i) at least one longitudinally extending rib or partition element 6, provided that when multiple partition elements are employed, the partition elements are transversely spaced-apart from one another, such partition elements being of substantially the same height and substantially parallel to one another, to define a single channel 8 or a series of channels between the partitions, extending longitudinally between the respective inlet and outlet basin openings of the filter elements and permeate sheet members, on both faces thereof, (ii) permeate passage openings 13 at the side portions of the sheet member, and (iii) the retentate sheet compression sealed to the second sheet of filter material at respective end and side portions thereof, with their basin openings and permeate passage openings in register with one another and the permeate passage opening of the retentate sheet member being compression sealed to the second sheet member of filter material, and with a central portion of the first sheet member of filter material and the retentate sheet member being unbonded to permit permeate contacting the retentate sheet member to flow through the second sheet member of filter material to the foraminous permeate sheet member.

In operation, the cross-flow filtration cassette provides a barrier through which the trap grease and long chain fatty acids and triglycerides are substantially restricted from passing through the filter sheets and allows the trap grease concentration to be increased.

After passing through the cross-flow filtration cassette, the permeate preferably does not include any trap grease. The retentate, which is returned to tank may still include some water and thus can be recirculated again. The water permeate may be further purified with the use of a second cross-flow filtration cassette wherein the pores of the filter sheet comprises a smaller diameter than the originally used cassette.

Figure 4:
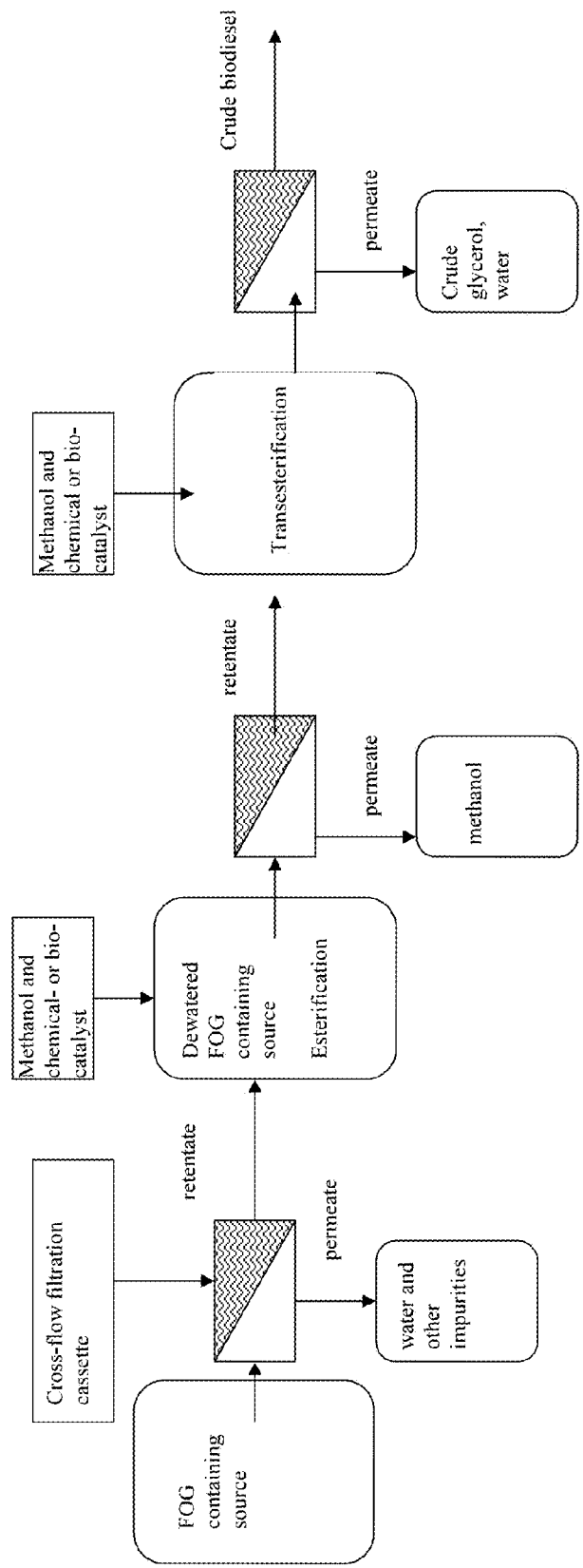
FIG. 4 shows a system for isolating the desired biodiesel product and purification of reaction products.
Figure 6:
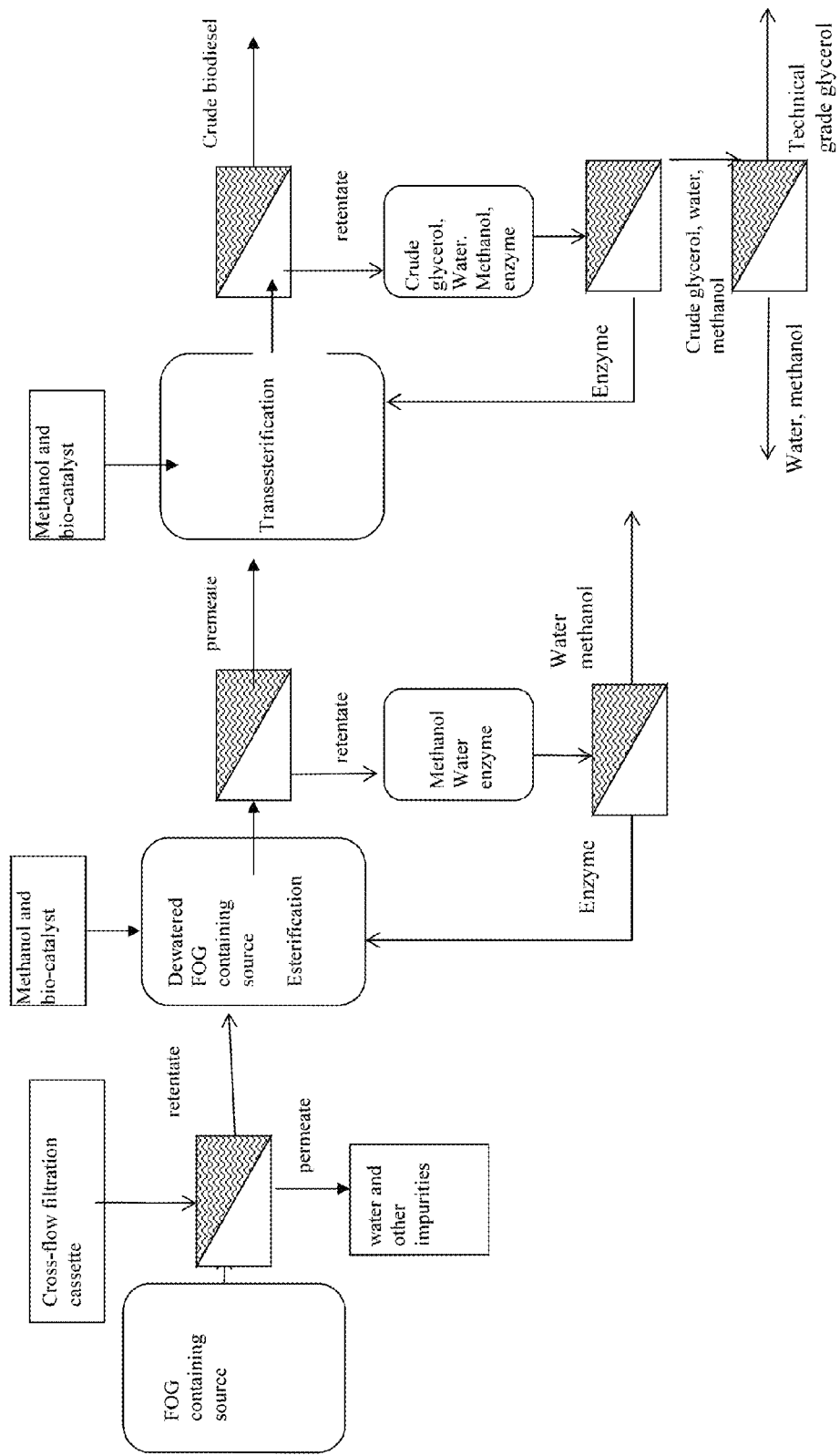
FIG. 6 shows a system for isolating the desired biodiesel product and purification of reaction products.

FIG. 4 illustrates one embodiment for converting a FOG containing liquid source to biodiesel. Initially, the FOG containing liquid, comprising both free fatty acids and triglycerides, may be subjected to size reduction by screening to remove large particle and unwanted material (not shown). The next step includes the pretreatment of the FOG containing liquid source to remove any unwanted water, retain the FOG that is emulsified within the unwanted water, and to increase concentration of the FOG containing liquid source. The FOG containing liquid source is mixed with methanol and a chemical catalyst (such as sulfuric acid) or a biocatalyst (such as at least one lipase and shown in FIG. 6) to initiate and provide for an esterification reaction of any free fatty acids in the trap grease or FOG containing liquid source. The methanol, water and enzyme in FIG. 6 are retained by the filter and the FOG containing liquid is passed through the filter and the medium is subjected to a transesterification reaction by combining with methanol and a chemical catalyst (such as an alkaline source) or a biocatalyst (such as at least one lipase). After completion of the transesterification reaction the methanol, enzyme and any formed glycerol is retained for further separation and purification. The water, enzyme and methanol mixture is further processed to retain the enzyme and reuse for subsequent production runs, as shown in FIG. 6. The glycerol, water and methanol mixture produced is referred to as crude glycerol (glycerin). The resulting crude glycerol can be further processed with an additional cross flow filtration step to remove reaction by-product contaminants, water and methanol to form a higher value technical grade glycerin, again as set forth in FIG. 6.

The esters are further refined for biodiesel and any contaminants such as water produced during the esterification process are removed. Notably, the systems of FIGS. 4 and 6 shows esterification first but clearly, transesterification can be conducted first. Further, if lipases are used both processes may be conducted at the same time in the same reaction vessel.

Figure 5:
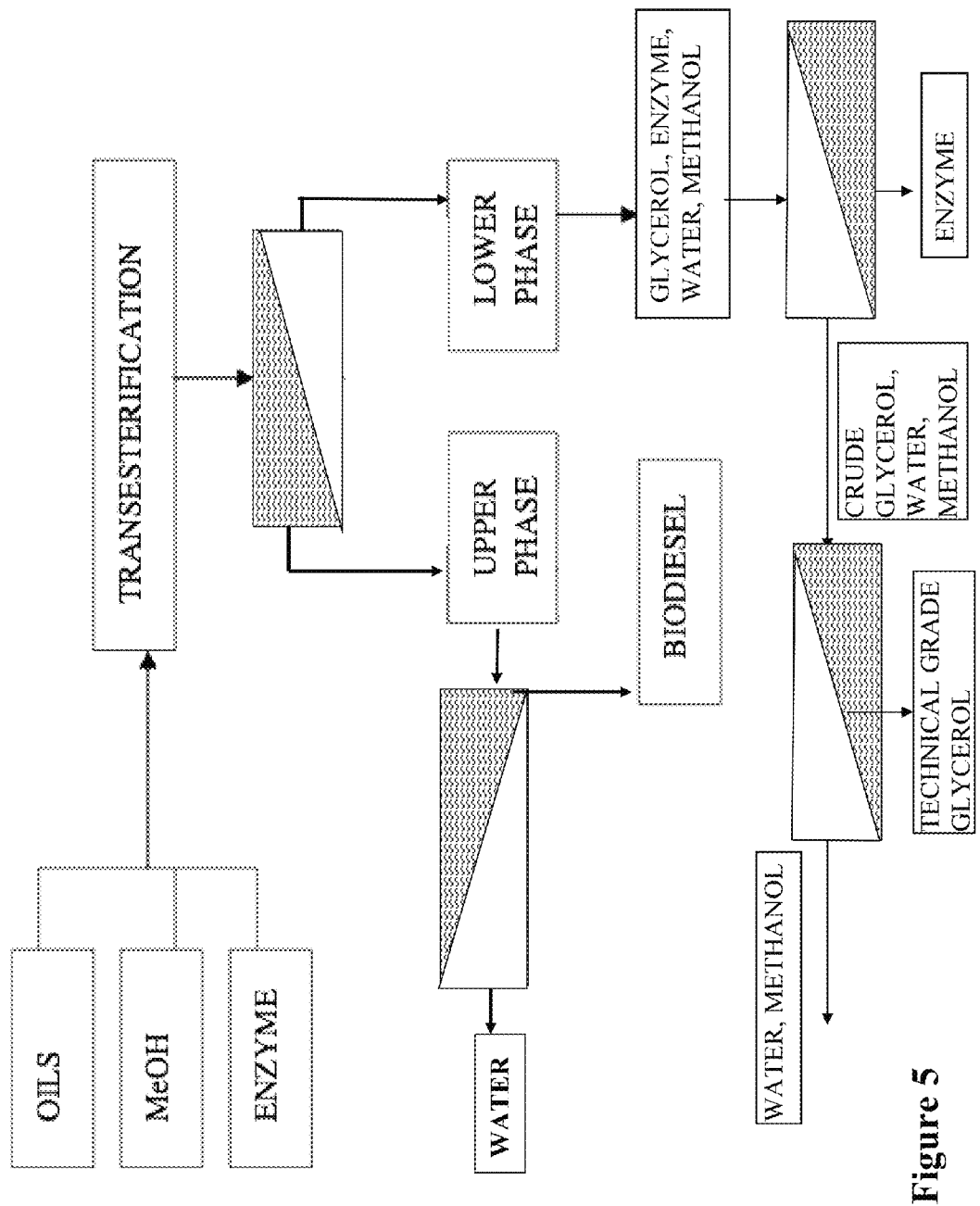
FIG. 5 shows a system for isolating the desired biodiesel product and purification of reaction products using enzymes.

FIG. 5 shows a simple schematic for the production of biodiesel produced by the transesterification of the vegetable oil or animal fat feedstock. In this process enzymes are used for the transesterification, which simply is a process of exchanging acyl groups between an ester and an alcohol (alcoholysis). For biodiesel production through alcoholysis, methanol is most commonly used to produce fatty acid methyl esters (FAME). Enzymes have several advantages over chemical catalysts such as mild reaction conditions and renewability. Enzymes or whole cells can be used as free species or can be immobilized and can be genetically engineered to improve their efficiency. The present figure shows the transesterification process using lipases as the biocatalyst to commercially convert oils and fats to FAME as biodiesel fuel. After the transesterification process, the liquid medium is passed through at least one cross-flow filtration cassette of the present invention. The upper phase which includes the crude biodiesel can be further purified by removing any excess water, methanol or free fatty acids produced during or used during the transesterification process. The glycerol and other remaining products can be further purified such that the crude glycerol can be converted into technical or pharmaceutical glycerol (glycerine).

That which is claimed is:

1. A method for producing an alkyl ester for use as a biodiesel fuel from an oil or grease source, wherein the oil or grease source comprises free fatty acids and triglycerides, the method comprising:
   (a) providing the oil or grease source as a liquid medium;
   (b) moving the oil or grease source through a first cross-flow filtration cassette wherein such oil or grease source is dewatered and the water content is separated into a water permeate stream and the remaining oil or grease source in the retentate stream is collected;
   (c) combining the oil or grease source retentate with an esterification biocatalyst and an alcohol in a first reaction medium to provide for an esterification reaction of any fatty acids in the oil or grease source retentate thereby from fatty acid esters;
   (d) separating the esterification biocatalyst from the reaction medium by using a second cross-flow filtration cassette, wherein the biocatalyst is on the retentate stream and is moved back to reaction medium of step c or captured for reuse by passing through a third cross-flow filtration cassette;

(e) moving the formed fatty acid esters and triglycerides in the permeate stream to a second reaction medium containing a transesterification biocatalyst and an alcohol to provide transesterification of the triglycerides thereby forming crude biodiesel and crude glycerol;

(f) separating the formed crude biodiesel and crude glycerol from the second reaction medium by using a fourth cross-flow filtration cassette;

(g) separating the transesterification biocatalyst from the crude glycerol and water by using a fifth cross-flow filtration cassette, wherein the transesterification biocatalyst is moved back to reaction medium of step e or captured for reuse; and (h) purifying the crude glycerol by passing through a sixth cross-flow filtration cassettes thereby forming a refined glycerol, wherein all of the cross-flow filtration cassettes comprise an array of sheet members, wherein the sheet members include in sequence in said array a first retentate sheet, a first filter sheet, a permeate sheet, a second filter sheet, and a second retentate sheet, wherein each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet.

2. The method of claim 1, wherein the oil source is plant oil, microalgae oil, animal oil, fish oil, lard, rendered fats, cooking oil, tallow or waste grease.

3. The method of claim 1, wherein the biocatalyst is an enzyme.

4. The method of claim 3, wherein the enzyme is a lipase and catalyzes a transesterification and/or esterification reaction.

5. The method of claim 1, wherein the oil source is initially treated to remove unwanted water using a cross-flow filtration, wherein the cross-flow filtration cassette comprises:

an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein at least the oil source, having a diameter larger than the filter sheet's pore size in the first cross-flow filtration cassette is retained in the retentate flow, and at least a portion of the unwanted water diffuses through the filter sheets and enters the permeate sheet and permeate flow.

6. The method of claim 5, wherein the unwanted water in the permeate flow can be further purified by a second pass through an additional cross-flow filtration cassette for removal of contaminants and/or emulsified oils.

7. The method of claim 4, wherein the enzyme is free, immobilized on a surface, suspended in a liquid solution or in an ionic solution.

8. The method of claim 1, wherein the alcohol is methanol or ethanol.

9. The method of claim 4, wherein the lipase is *candida antarctica* lipase, *thermomyces lanuginosa* lipase, *Rhizomucor miehei* lipase, *Rhizopus* oryzae lipase, *candida rugosa* lipase, *Candida* cylindracae lipase *pseudomonas fluorescens* lipase, *Aspergillus niger* lipase, *pseudomonas cepacia* lipase, or chromobacterium *viscosum* lipase.

10. The method of claim 7, wherein the enzyme is immobilized by absorption on carrier, attachment to ion exchange resins, covalent bond attachment to supports, or trapping in hydrophobic gels.

11. The method of claim 1, wherein the refined glycerol is technical or pharmaceutical grade glycerol.

* * * * *